United States Patent
Al-Yousef et al.

(10) Patent No.: US 10,134,207 B2
(45) Date of Patent: Nov. 20, 2018

(54) SECURING SCADA NETWORK ACCESS FROM A REMOTE TERMINAL UNIT

(71) Applicant: Saudi Arabian Oil Company, Dhahran (SA)

(72) Inventors: Hassan S. Al-Yousef, Qatif (SA); Fouad M. Alkhabbaz, Qatif (SA); Zakarya A. Abu Al Saud, Saihat (SA); Soloman M. Almadi, Dhahran (SA)

(73) Assignee: Saudi Arabian Oil Company

( * ) Notice: Subject to any disclaimer, the term of this patent is extended or adjusted under 35 U.S.C. 154(b) by 0 days.

(21) Appl. No.: 15/492,744

(22) Filed: Apr. 20, 2017

(65) Prior Publication Data

US 2018/0308302 A1 Oct. 25, 2018

(51) Int. Cl.
| | | |
|---|---|---|
| *G07C 9/00* | (2006.01) | |
| *H04L 29/06* | (2006.01) | |
| *H04N 5/33* | (2006.01) | |

(52) U.S. Cl.
CPC ...... *G07C 9/00039* (2013.01); *G07C 9/00111* (2013.01); *H04L 63/0428* (2013.01); *H04N 5/33* (2013.01)

(58) Field of Classification Search
CPC .. G07C 9/00039; G07C 9/00111; H04N 5/33; H04L 63/0428; H04L 63/0861; H04L 63/0853; H04L 63/105; H04W 12/06
See application file for complete search history.

(56) References Cited

U.S. PATENT DOCUMENTS

| | | | |
|---|---|---|---|
| 6,163,257 A | 12/2000 | Tracy | |
| 7,644,290 B2 | 1/2010 | Ransom et al. | |
| 7,940,302 B2 | 5/2011 | Mehrotra et al. | |
| 8,102,238 B2 | 1/2012 | Golander et al. | |
| 8,312,320 B2* | 11/2012 | Almadi | G01V 11/002 340/853.2 |
| 8,334,775 B2 | 12/2012 | Tapp et al. | |
| 8,365,250 B2* | 1/2013 | Denny | H04L 63/08 709/201 |
| 8,543,716 B1* | 9/2013 | Rashidi | G06Q 30/06 709/226 |
| 8,750,513 B2 | 6/2014 | Renkis | |
| 9,208,676 B2 | 12/2015 | Fadell et al. | |
| 2005/0184084 A1* | 8/2005 | Wells | B67D 7/222 222/1 |
| 2006/0107061 A1 | 5/2006 | Holovacs | |

(Continued)

OTHER PUBLICATIONS

International Search Report and Written Opinion issued in International Application No. PCT/US2018/028055 dated Jun. 27, 2018, 14 pages.

*Primary Examiner* — Brian E Miller
(74) *Attorney, Agent, or Firm* — Fish & Richardson P.C.

(57) ABSTRACT

A first message from a remote terminal unit (RTU) is received, where the first message indicates that a motion has been detected. In response to receiving the first message, a timer is started at a supervisory control and data acquisition (SCADA) server. Whether a personal identification number (PIN) verification and a radio-frequency identification (RFID) verification have succeeded is determined before the timer expires. In response to determining that at least one of the PIN verification or the RFID verification fails, a communication port connecting the RTU with the SCADA server is disabled.

20 Claims, 3 Drawing Sheets

(56) References Cited

U.S. PATENT DOCUMENTS

| | | | |
|---|---|---|---|
| 2007/0126576 A1 | 6/2007 | Script et al. | |
| 2007/0193834 A1* | 8/2007 | Pai | G06Q 10/08 |
| | | | 186/3 |
| 2008/0109883 A1 | 5/2008 | Hernoud et al. | |
| 2008/0228908 A1* | 9/2008 | Link | H04L 41/046 |
| | | | 709/223 |
| 2009/0141896 A1* | 6/2009 | McCown | G06Q 20/3223 |
| | | | 380/255 |
| 2010/0097205 A1 | 4/2010 | Script | |
| 2012/0162423 A1* | 6/2012 | Xiao | B60R 25/305 |
| | | | 348/148 |
| 2012/0307051 A1 | 12/2012 | Welter | |
| 2013/0247117 A1* | 9/2013 | Yamada | G08C 17/02 |
| | | | 725/93 |
| 2014/0019768 A1 | 1/2014 | Pineau et al. | |
| 2014/0089671 A1* | 3/2014 | Logue | H04L 63/0884 |
| | | | 713/182 |
| 2014/0139681 A1 | 5/2014 | Jones, Jr. et al. | |
| 2014/0254799 A1* | 9/2014 | Husted | H04W 76/38 |
| | | | 380/270 |
| 2016/0006745 A1* | 1/2016 | Furuichi | G06F 21/31 |
| | | | 726/28 |
| 2016/0379211 A1* | 12/2016 | Hoyos | H04L 63/0823 |
| | | | 705/75 |
| 2017/0353491 A1* | 12/2017 | Gukal | H04L 63/1491 |
| 2018/0092331 A1* | 4/2018 | Zuidhof | A01K 5/0142 |

\* cited by examiner

SECURING SCADA NETWORK ACCESS FROM A REMOTE TERMINAL UNIT

TECHNICAL FIELD

This disclosure relates to securing SCADA network access from a remote terminal unit.

BACKGROUND

In industries that have field operations in remote areas, a supervisory control and data acquisition (SCADA) network is used to provide communications between electronic devices in remote areas and in the operation control center. Examples of these industries include the oil and gas industry, power industry, mining industry and the like. A SCADA network is a control system that uses computers, networked data communications and graphical user interfaces for high-level process supervisory management, and uses other peripheral devices such as programmable logic controllers and discrete proportional-integral-derivative (PID) controllers to interface to the process plant or machinery.

SUMMARY

The present disclosure describes methods and systems, including computer-implemented methods, computer program products, and computer systems for securing SCADA network access from a remote terminal unit.

In an implementation, a first message from a remote terminal unit (RTU) is received, where the first message indicates that a motion has been detected. In response to receiving the first message, a timer is started at a supervisory control and data acquisition (SCADA) server. Whether a personal identification number (PIN) verification and a radio-frequency identification (RFID) verification have succeeded is determined before the timer expires. In response to determining that at least one of the PIN verification or the RFID verification fails, a communication port connecting the RTU with the SCADA server is disabled.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. The remote terminal unit (RTU) with enhanced security capabilities can receive indications of motion events detected near the RTU and verify security information in response to motion event indication. The RTU can further inform the supervisory control and data acquisition (SCADA) network to disable the communication between the RTU and the SCADA network if the security information verification fails. These enhancements protect the SCADA network from attacks generated through RTUs in remote areas and improve the security of the SCADA network. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
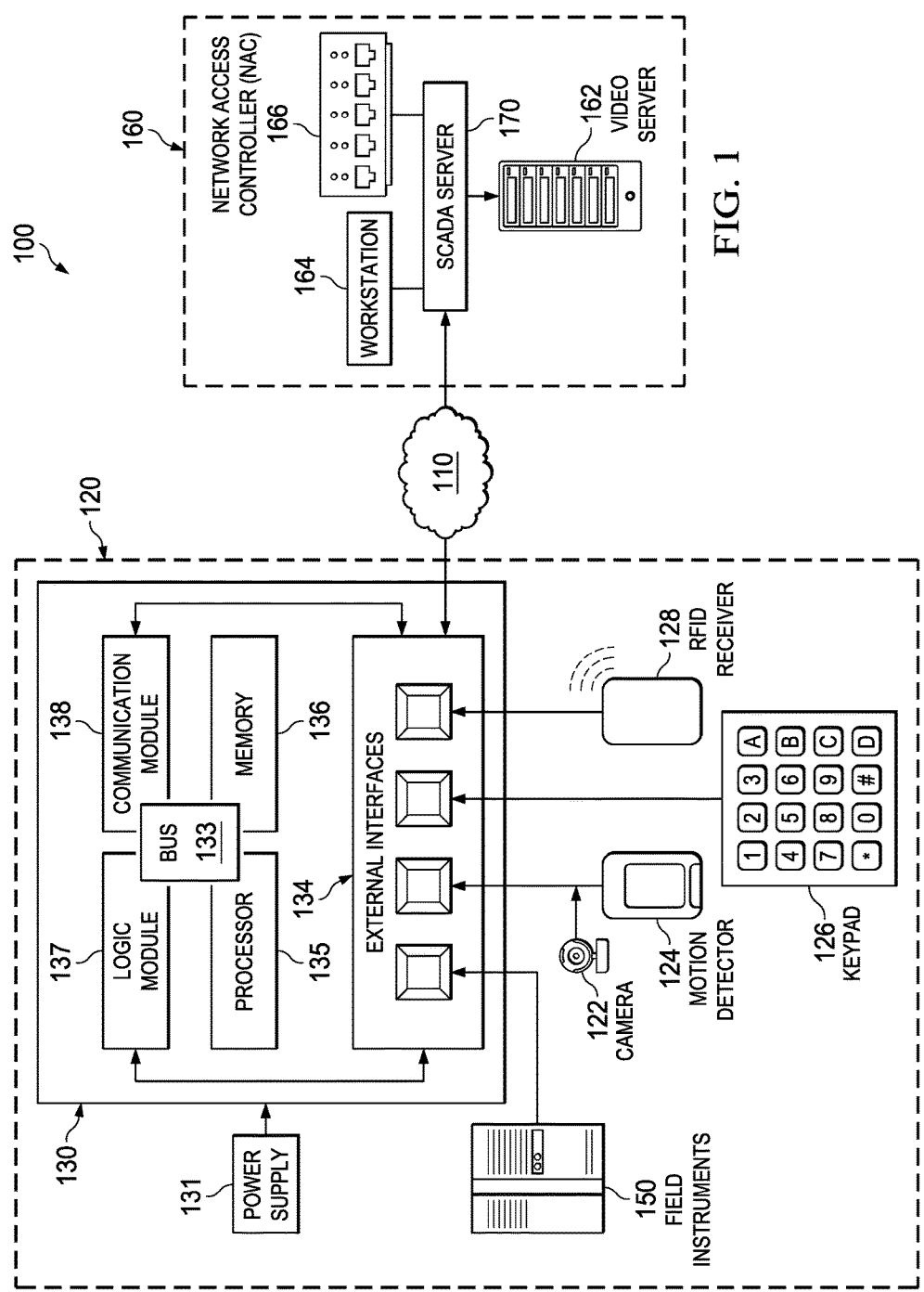
FIG. 1 is a high level schematic diagram illustrating a security system for securing network access for an RTU, according to an implementation.

The following detailed description describes securing SCADA network access from a remote terminal unit (RTU), and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

The SCADA network can include a SCADA server, one or more remote terminal units (RTUs), and one or more field instruments. The SCADA server can include operator interfaces that enable the monitoring and issuing of process commands, such as controller set point changes. A RTU is a microprocessor-controlled electronic device that interfaces objects in the physical world to the SCADA network by transmitting telemetry data to a master system, and by using messages from the SCADA network to control connected objects. A RTU includes networked modules that perform real-time control logic or controller calculations. An RTU can also be referred to as a remote telemetry unit or a remote telecontrol unit. The field instruments include field sensors and actuators that are controlled by the RTU.

While the SCADA server can be located in an operation management, a RTU is installed in remote areas, close to the field instruments that are controlled by the RTU. In some case, the location of the RTU is far away from human habitats and strict physical security of the RTU may be difficult to achieve. Therefore, an RTU, and its communication components that interface to the SCADA network may be subject to attacks. An attacker may control the RTU, and gain access to the SCADA network through the communication interface between the RTU and the SCADA network. The attacker may obtain information of the SCADA network, interfere with the management operation of the SCADA network, and control other RTUs, and field instruments in other remote areas through these other RTUs.

In some cases, an integrated security system may be implemented to secure the network access from an RTU. The integrated security system can include an enhanced RTU that can detect a motion event. In response to the detection of the motion event, a dual factor authentication is performed. The dual factor authentication includes an authentication based on Radio Frequency Identification Data (RFID), and an authentication based on Personal Information Number (PIN). In some implementations, the RFID authentication shall precede the PIN authentication. If at least one authentication fails, the intruding event is detected and the communication port between the enhanced RTU and the SCADA network shall be disabled. A video surveillance can also be activated once an intruding event is detected. FIGS. 1-4 and associated descriptions provide additional details of these implementations.

FIG. 1 is a high level schematic diagram illustrating a security system 100 for securing SCADA network access for an RTU, according to an implementation. The security system 100 includes a remote location 120 and a central control location 160 that are connected over a network 110.

The remote location 120 represents a remote area where an RTU is located. For example, the remote location 120 can represent a drilling site or an exploration site associated with a hydrocarbon production system, a transmission site associated with a power supply system, or the like. The remote location 120 can be located a great distance, for example hundreds of kilometers, from places where humans aggregate. Additionally, the remote location 120 can be located in the middle of a desert, an ocean, or other places not suitable for human habitation.

The remote location 120 includes field instruments 150 and a RTU 130. The field instruments 150 represent one or more devices that can be controlled by the RTU 130. For example, the field instrument 150 can be a valve of a well that can be opened or closed by the RTU 130, or a temperature or pressure sensor installed on a well whose readings can be accessed by the RTU 130. In some cases, the RTU 130 can control more than one field instrument 150.

The remote location 120 includes a camera 122, a motion detector 124, an RFID receiver 128, and a keypad 126. The camera 122 represents a camera having an industrial grade reliability. For example, the camera 122 can include features such as dust-proof, explosion protection, erosion resistance, or any other features that enable the camera 122 to operate in hazardous environment. The camera 122 can also include infra-red capabilities that enable the camera 122 to take pictures or videos at night. The camera 122 can be positioned near the RTU 130 and triggered by the RTU 130 to take pictures or videos of the areas surrounding the RTU 130. In some cases, the camera 122 can store the pictures or videos. Alternatively or additionally, the camera 122 can transmit the pictures or videos that it took to the RTU 130 for recording.

The motion detector 124 includes an optical, microwave, or acoustic sensor that can be used to detect motions surrounding the RTU 130. The motion detector 124 can transmit an indication to the RTU 130 if a motion is detected. The motion detector 124 can also have industrial grade capabilities.

The keypad 126 includes a keyboard, buttons, touch screens or any other components that can receive inputs representing a PIN. The PIN can include one or more alphanumeric symbols, mathematical symbols, grammatical symbols, or any other symbols. A user can use the keypad 126 to enter the PIN and the keypad 126 can transmit the received PIN to the SCADA server for authentication 130. The keypad 126 can also have industrial grade capabilities.

The RFID receiver 128 can be positioned near the RTU 130 and can read information stored on a RFID device that is close to the RTU 130. In some cases, a user can carry an RFID device that stores identity information of the user. The RFID receiver 128 can receive the stored identity information and transmit the information to the RTU 130 if the user is near the RTU 130. The RFID receiver 128 can be a passive or an active RFID receiver. The RFID receiver 128 can also have industrial grade capabilities.

The RTU 130 is an RTU that interfaces with the field instrument 150 in the remote location for a SCADA network operating in the central control location 160. The RTU 130 includes a logic module 137, a communication module 138, a bus 133, a processor 135, a memory 136, and external interface 134. In some cases, any or all parts of the camera 122, the motion detector 124, the RFID receiver 128, and the keypad 126 can be integrated in the RTU 130.

Figure 2:
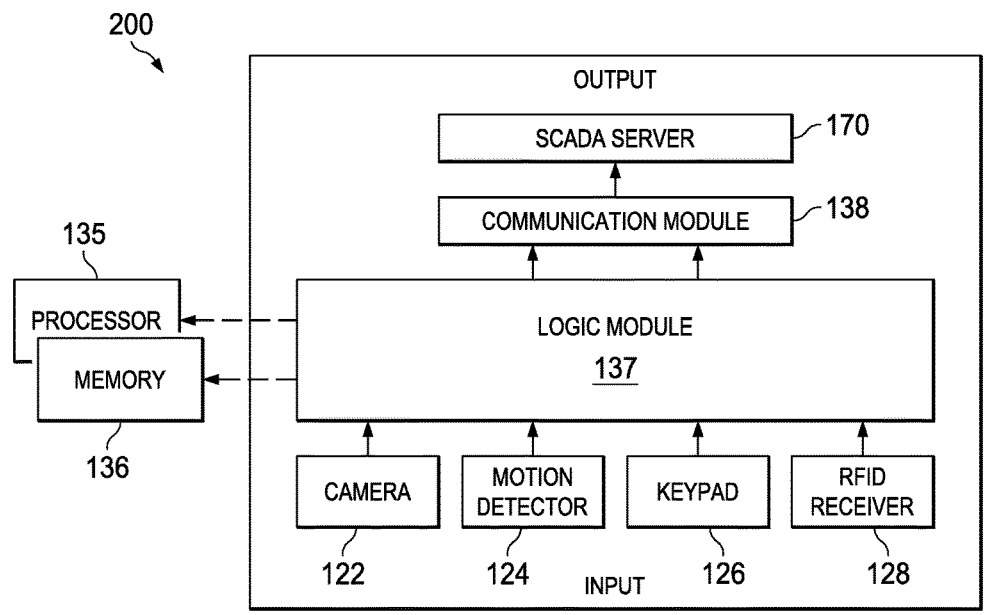
FIG. 2 is a block diagram illustrating example operations of a logical module in an RTU, according to an implementation.
Figure 3:
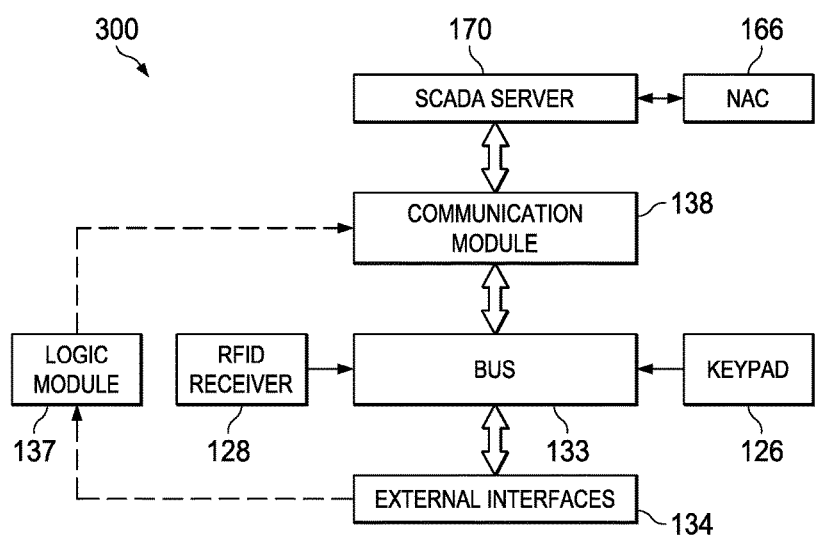
FIG. 3 is a block diagram illustrating example operations of a communication module in an RTU, according to an implementation.
Figure 4:
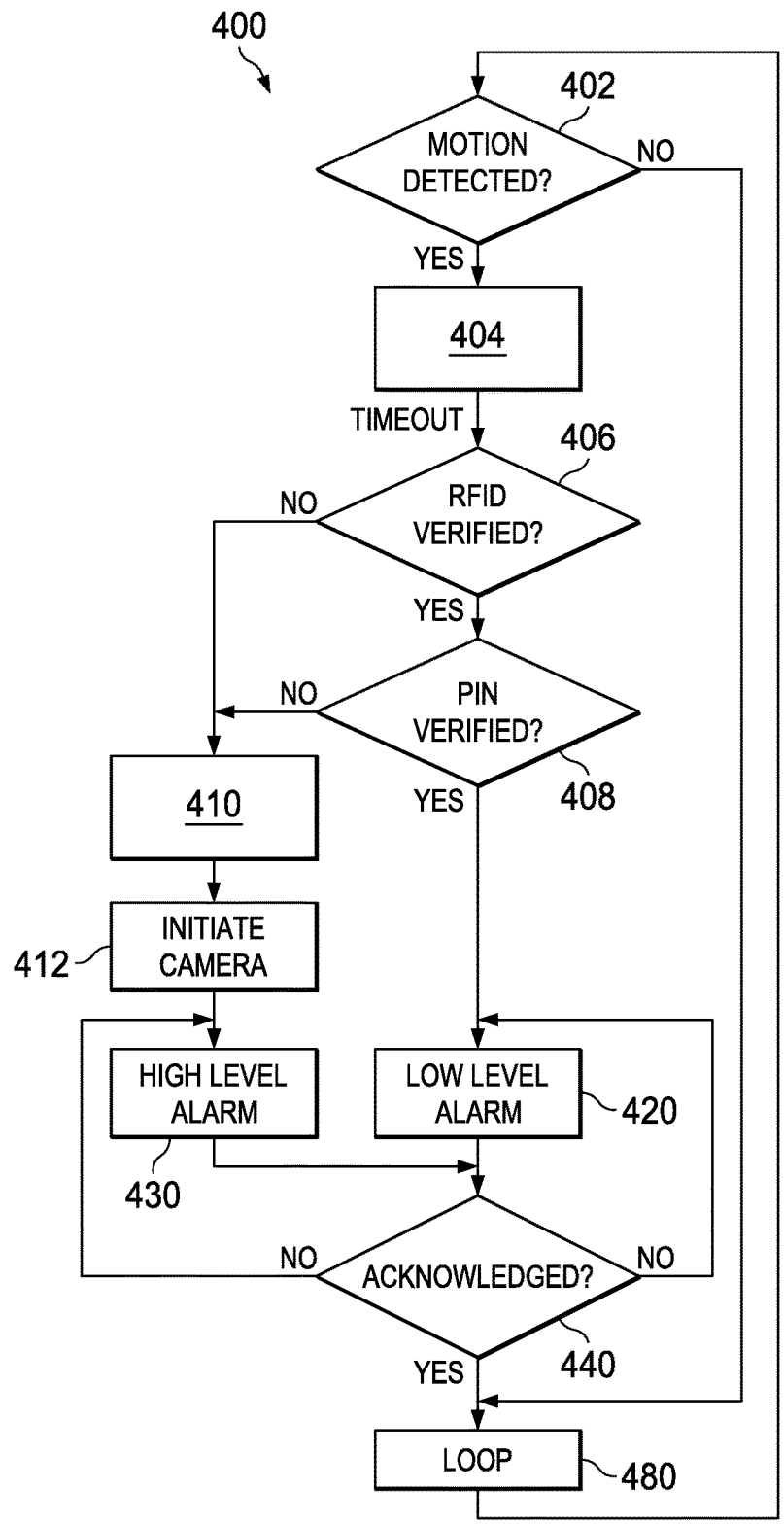
FIG. 4 is a flowchart illustrating an example process for securing network access for an RTU, according to an implementation.

The logical module 137 represents an application, set of applications, software, software modules, hardware, or combination of software and hardware that can be used to secure network access from the RTU 130. The logical module 137 can process information received from the motion detector 124, the keypad 126, and the RFID receiver 128. The logical module 137 can also generate messages based on the information received from the motion detector 124, the keypad 126, and the RFID receiver 128. FIGS. 2-4 provide additional descriptions of these implementations.

The communication module 138 represents an application, set of applications, software, software modules, hardware, or combination of software and hardware that can be used for communication between the RTU 130 and other components in the system 100. In some cases, the communication between the RTU 130 and other components in the system 100 can be performed through the external interface 134. For example, the communication module 138 can receive inputs from the motion detector 124, the keypad 126, and the RFID receiver 128, using the external interface 134 and pass the inputs to the logical module 137. The communication module 138 can also transmit the message generated by the logical module 137 to the central control location 160, using the external interface 134. The communication module 138 can include software supporting one or more communication protocols associated with communications over the network 110. For example, the communication between the RTU 130 and one or more components in the remote location 120 can be performed according to Ethernet or industrial Ethernet communication standards. The external interface 134 can also include hardware that is operable to communicate physical signals within and outside of the RTU 130. FIGS. 3-4 provide additional descriptions of these implementations.

The bus 133 facilitates communications between different components within the RTU 130. The power supply 131 provides power for the operations of the RTU 130, the camera 122, the motion detector 124, the RFID receiver 128, the keypad 126, or any combinations thereof. The power supply 131 may include alternative current (AC) to direct current (DC) converters where operated from a station battery system. In some cases, the power supply 131 can be integrated in the RTU 130.

The RTU 130 includes the processor 135. Although illustrated as a single processor 135 in FIG. 1, two or more processors may be used according to particular needs, desires, or particular implementations of the RTU 130. Generally, the processor 135 executes instructions and manipulates data to perform the operations of the RTU 130 and any algorithms, methods, functions, processes, flows, and procedures, as described in the instant disclosure.

The RTU 130 also includes the memory 136 that can hold data for the RTU 130. The memory 136 can be random access memory (RAM), read-only memory (ROM), optical, magnetic, and the like storing data consistent with this disclosure. In some implementations, the memory 136 can be a combination of two or more different types of memory (for example, a combination of RAM and magnetic storage) according to particular needs, desires, or particular implementations of the RTU 130 and the described functionality. Although illustrated as a single memory 136 in FIG. 1, two or more memories 136 (of the same or combination of types) can be used according to particular needs, desires, or particular implementations of the RTU 130 and the described functionality. While the memory 136 is illustrated as an integral component of the RTU 130, in alternative implementations, the memory 136 can be external to the RTU 130.

The central control location 160 represents a control area where a SCADA server 170 is located. The SCADA server 170 represents an application, set of applications, software, software modules, hardware, or combination of software and hardware that performs supervisory operations of the RTUs and field instruments in the SCADA network. The SCADA server 170 includes one or more SCADA interfaces that connect the SCADA server with RTUs, including the RTU 130, that operate in remote areas. The SCADA server 170 can also include, or interact with a network management system that performs the operation, administration, and management operations of the SCADA network.

As illustrated, the SCADA server 170 is connected to a workstation 164, a Network Access Controller (NAC) 166, and a video server 162. The NAC 166 represents an application, set of applications, software, software modules, hardware, or combination of software and hardware that can be used to control network access of the SCADA network. For example, the NAC 166 controls the communication port for each RTU, including the RTU 130, that connects the respective RTU with the SCADA server 170. In one example, the NAC 166 can receive a message indicating that an intruding event occurred at the RTU 130. The NAC 166 can disable the communication port corresponding to the RTU 130, and thereby prevent intruders from accessing the SCADA network from the RTU 130. FIGS. 2-4 provide additional descriptions of these implementations.

The video server 162 represents an application, set of applications, software, software modules, hardware, or combination of software and hardware that can be used to process video images. In some cases, the camera 122 can record video images of the surrounding areas of the RTU 130 in the remote location 120. The video images can be stored in the camera 122 or the RTU 130. The video images can be retrieved and analyzed by the video server 162. In some cases, the video server 162 can include a facial recognition application. The facial recognition application can be used to analyze the video images and determine the identity of one or more people whose images have been captured by the camera 122.

The workstation 164 represents an application, set of applications, software, software modules, hardware, or combination of software and hardware that presents an interface for a human operator to interact with the SCADA network. The workstation 164 can include a human machine interface (HMI) device, a server, desktop computer, laptop/notebook computer, wireless data port, smart phone, personal data assistant (PDA), tablet computing device, one or more processors within these devices, or any other computing devices that provide a user interface to the SCADA network. The workstation 164 can include an input device, such as a keypad, keyboard, touch screen, or other device that can accept user information, and an output device that conveys information associated with the operation of the SCADA network, including digital data, visual, or audio information (or a combination of information), or a graphical user interface (GUI). A SCADA network can include more than one workstations 164.

The network 110 includes a wireless network, a wireline network, or a combination thereof that connects the RTU 130 at the remote location 120 with the SCADA server 170. The network 110 can also provide communication between the SCADA server 170 with other RTUs in other remote locations. In some cases, the security messages transmitted between the RTU 130 and the SCADA server 170 can be constructed according to the 802.1x standard.

In operation, when the motion detector 124 detects a motion in the remote location 120, the motion detector 124 transmits an indication to the RTU 130. The RTU 130 transmits a message to the SCADA server 170 indicating the motion detection. The SCADA server 170 activates a timer. Before the timer expires, the RTU 130 receives RFID information from the RFID receiver 128 and PIN input from the keypad 176. The RTU 130 sends the RFID information and the PIN input to the SCADA server 170. The SCADA server 170 determines whether the RFID information and the PIN input are verified before the timer expires. If both have been verified, a low level alarm is triggered to record the event. If at least one of the PIN input or the RFID information have not been verified before the timer expires, the camera 122 is triggered to initiate recording, and the communication port corresponding to the RTU 130 is disabled to prevent intruders from using the RTU 130 to access the SCADA network 170. A high level alarm is also triggered. In some cases, the RTU 130 can continue to control field instruments 150 at the remote location 120, while the communication between the RTU 130 and the SCADA network is disabled. FIG. 4 and associated descriptions provide additional details of these implementation.

FIG. 2 is a block diagram illustrating example operations of the logical module 137, according to an implementation. The logical module 137 includes a security configuration application that analyzes input from the motion detector 124, the RFID receiver 128, and the keypad 126. As discussed previously, the security configuration application can determine that a motion has been detected by the motion detector 124. The security configuration application can also generate message content that indicates the detection of the motion event and encapsulate PIN input and RFID information. FIG. 4 and associated descriptions provide additional details of these implementation.

In some cases, the logical module 137 can also include an encryption application. The encryption application can encrypt and decrypt the messages communicated between the RTU 130 and the SCADA server 170, or any other entities in the SCADA network. The encryption operation can be performed using public or private key encryption, symmetrical encryption, or any other encryption method.

In some cases, the logical module 137 can include applications that control the operations of the field instruments connected to the RTU 130. These operations can include valve control, instrument readings, abnormal operating condition detection, data processing, operating condition control, or any combinations thereof. Alternatively or in combination, these operations can be implemented by other software modules in the RTU 130.

The security configuration application, the configuration application, the encryption application, or any other applications in the RTU 130 can be stored in the memory 136 and executed by the processor 135. In some implementations, any of the components can be swapped without interrupting the security operations discussed previously.

FIG. 3 is a block diagram illustrating example operations of the communication module 138, according to an implementation. The communication module 138 facilitates communications between the logical module 137 in the RTU 130 with the SCADA server 170 at the central location 160. For example, the communication module 138 can include application that constructs the messages content generated by the logical module 137 into security messages according to a communication protocol. The communication module 138 can also include applications that facilitate communication between the RTU 130 and other components in the remote location 120. For example, the communication module 138 can include software or hardware that perform analog-to-digital image conversion to digitize images received from the camera 122.

FIG. 4 is a flowchart illustrating an example process 400 for securing SCADA network access for an RTU, according to an implementation. For clarity of presentation, the description that follows generally describes the process 400 in the context of the other figures in this description. However, it will be understood that the process 400 may be performed, for example, by any suitable system, environment, software, and hardware, or a combination of systems, environments, software, and hardware, as appropriate. In some implementations, various steps of the process 400 can be run in parallel, in combination, in loops, or in any order.

At 402, the RTU determines whether a motion has been detected. As discussed previously, a motion detector can be used to detect motions in the area surrounding an RTU. If the motion detector detects a motion event, the motion detector can send an indication to the RTU. If the RTU determines that no motion has been detected, the process 400 continues in the loop 480.

If the RTU determines that a motion is detected, for example by receiving a motion detected indication from the motion detector, the process 400 proceeds from 402 to 404, where a timer is triggered. In some implementations, the operation of the timer can be performed in the central control location. For example, the timer can be implemented by a SCADA server. In these implementations, if the RTU receives a motion detected indication, the RTU can transmit a message to the SCADA server indicating that a motion is detected in areas surrounding the RTU. The SCADA server can trigger the timer. The timer can be set to a time period for an RFID verification and a PIN verification to take place. In one example, the timer can be set to 10 seconds. Once triggered, the timer starts to run down. The communication port at the central control location that connects the SCADA server to the RTU remains in the standby state while the timer is running.

The process 400 proceeds from 404 to 406, where whether the RFID has been verified. In some cases, the RFID receiver can detect the information stored on an RFID of a user whose motion was detected. The RFID receiver can send the RFID information to the RTU, and the RTU can send the RFID information to the SCADA server. The SCADA server can match the RFID information with that of an authorized user. For example, the SCADA server can be configured to store identification information of users that are authorized to access the RTU. A user can carry an RFID that stores the identification information of the user. Therefore, the SCADA server can compare the identification information stored on the RFID with the identification information of the authorized user and determine whether the user is authorized. Examples of the identification information can include an employee identifier, a name, or any other information identifying an authorized user.

If the RFID is verified, the process 400 proceeds from 406 to 408, where the PIN is verified. In one example, the user whose motion is detected can enter a PIN on a PIN keypad. The PIN keypad can transmit the received PIN to the RTU. The RTU can send the PIN to the SCADA server. The SCADA server can compare the PIN with a stored PIN to verify whether the PIN is correctly entered.

In some cases, the RTU can send the RFID information or the PIN in an authentication message to the SCADA server. The authentication message can be formatted according to the IEEE 802.1x standard. In some cases, the authentication message can include an identifier of the RTU. In some cases, different PINs can be configured for different RTUs. The SCADA server can identify the particular RTU that sends the authentication information, and match the received PIN with the stored PIN that corresponds to the particular RTU.

If both the PIN and the RFID have been verified before the timer expires, the process 400 proceeds from 408 to 420, where a low level alarm is triggered at the SCADA server. The low level alarm can be used to notify the SCADA network operator that an authorized access has occurred at the RTU. In some cases, when the low level alarm is triggered, the event of a successful verification can be recorded in a security log. The security log can include the identity of the particular RTU that reports the event, the time of the event, the identity of the user who has been verified, or any combinations thereof. The timer is reset to the initial value and deactivated.

In some cases, the low level alarm procedure can also trigger an acknowledgement procedure by a human operator. In these cases, the process 400 proceeds from 420 to 440, where a notification for acknowledgement is presented at a workstation connected to the SCADA server. A human operator can see the notification, check information of the logged event, and issue an acknowledgment through the workstation. This approach provides an opportunity for a human operator to determine if there are any security risks associated with the event. If the acknowledgement has not been received within a configured time, the process 400 proceeds from 440 to 420, where another low level alarm is triggered and another notification can be presented for acknowledgement.

After the notification of the low level alarm is acknowledged, the process 400 proceeds from 440 to the loop 480, where the motions are continued. Because both the RFID and PIN have been verified, the communication port that corresponds to the RTU remains in the standby state.

If the RFID information has not been verified before the timer expires, the process 400 proceeds from 406 to 410. Similarly, if the RFID information has been verified but the PIN has not been verified before the timer expires, the process 400 proceeds from 408 to 410. At 410, the SCADA server determines that a potential intrusion may have occurred.

From 410, the process 400 proceeds to 412, where the camera is triggered to record scenes surrounding the RTU. In some cases, the camera can be triggered by a SCADA network operator at the central control location. In some cases, the SCADA server can send a message to the RTU to instruct the RTU to trigger the camera, and the RTU can send a command to the camera to initiate recording. From 412, the process 400 proceeds to 430, where a high level alarm is triggered at the SCADA server. The SCADA server can transmit a command to the NAC to disable the communication port that corresponds to the particular RTU. This approach prevents the unauthorized intruder from accessing the SCADA network using the RTU.

In some cases, the high level alarm procedure can trigger a logging of the intruding event. The information related to the intruding event, for example, the identity of the particular RTU that reports the event and the time of the event, can be recorded.

In some cases, the high level alarm procedure can also trigger an acknowledgement procedure by a human operator. In these cases, the process 400 proceeds from 430 to 440, where a notification for acknowledgement is presented at a workstation. A human operator can see the notification, check information of the logged event, and issue an acknowledgment through the workstation. The high level alarm procedure can also trigger a field verification operation. In one example, one or more security personnel can be dispatched to the site of RTU that reports the intruding event. The security personnel can retrieve the images taken by the camera for analysis and determine if there are any other security issues. The communication port at the NAC that corresponds to the RTU can be reactivated if the security issues have been cleared. In some cases, the surveillance mechanism associated with the RTU can also be reactivated by the SCADA network operator once the security issues have been cleared. For example, the timer associated with the RTU can be reset to the initial value and deactivated.

If the acknowledgement has not been received within a configured time, the process 400 proceeds from 440 to 430, where another high level alarm is triggered and another notification can be presented for acknowledgement. After the notification of the high level alarm is acknowledged, the process 400 proceeds from 440 to the loop 480. In this case, while the RTU can continue to operate in the remote area, including for example controlling field instruments, determining motion detection events and verifying RFID and PIN, the communication port connects the RTU and the SCADA network remains in a disabled state. In some cases, the low level alarm and the high level alarm can be transmitted in the central control location using digital I/O, industrial protocols such as Modbus, Open Platform Communications (OPC), and the like.

Described implementations of the subject matter can include one or more features, alone or in combination.

For example, in a first implementation, a computer-implemented method comprising: receiving, a first message from a remote terminal unit (RTU), wherein the first message indicates that a motion has been detected; in response to receiving the first message, starting a timer at a supervisory control and data acquisition (SCADA) server; determining whether a personal identification number (PIN) verification and a radio-frequency identification (RFID) verification have succeeded before the timer expires; and in response to determining that at least one of the PIN verification or the RFID verification fails, disabling a communication port connecting the RTU with the SCADA server.

The foregoing and other described implementations can each, optionally, include one or more of the following features:

A first feature, combinable with any of the following features, the method further comprising, in response to determining that at least one of the PIN verification or the RFID verification fails, transmitting a second message to the RTU, wherein the second message initiates a recording of video images by a camera.

A second feature, combinable with any of the previous or following features, wherein the camera includes infra-red (IR) night vision capabilities.

A third feature, combinable with any of the previous or following features, wherein the RTU performs a control operation of a field instrument while the communication port is disabled, and the control operation includes at least one of a valve control operation, an instrument reading operation, an abnormal operating condition detection operation, a data processing operation, or an operating condition control operation.

A fourth feature, combinable with any of the previous or following features, the method further comprising: receiving, a third message from a remote terminal unit (RTU), wherein the third message indicates that another motion has been detected; in response to receiving the third messages, starting a second timer; determining whether a second personal identification number (PIN) verification and a second radio-frequency identification (RFID) verification have succeeded before the second timer expires; and in response to determining that the second PIN verification and the second RFID verification have succeeded, initiating a logging procedure at the SCADA server.

A fifth feature, combinable with any of the previous or following features, wherein the first message is formatted according to an 802.1x standard.

A sixth feature, combinable with any of the previous or following features, wherein the first message is encrypted by the RTU.

In a second implementation, a supervisory control and data acquisition (SCADA) server comprises: a memory; and at least one hardware processor communicatively coupled with the memory and configured to: receive, a first message from a remote terminal unit (RTU), wherein the first message indicates that a motion has been detected; in response to receive the first message, start a timer at the supervisory control and data acquisition (SCADA) server; determine whether a personal identification number (PIN) verification and a radio-frequency identification (RFID) verification have succeeded before the timer expires; and in response to determining that at least one of the PIN verification or the RFID verification fails, disable a communication port connecting the RTU with the SCADA server.

The foregoing and other described implementations can each, optionally, include one or more of the following features:

A first feature, combinable with any of the following features, the SCADA server further comprising an interface configured to receive RFID information and a PIN input from the RTU, wherein the at least one hardware processor is configured to: determine whether the PIN verification has succeeded based on PIN input; and determine whether the RFID verification has succeeded based on the RFID information.

A second feature, combinable with any of the previous or following features, wherein the at least one hardware processor is further configured, in response to determining that at least one of the PIN verification or the RFID verification fails, to transmit a second message to the RTU, wherein the second message initiates a recording of video images by a camera.

A third feature, combinable with any of the previous or following features, wherein the camera includes infra-red (IR) night vision capabilities.

A fourth feature, combinable with any of the previous or following features, wherein the RTU performs a control operation of a field instrument while the communication port is disabled, and the control operation includes at least one of a valve control operation, an instrument reading operation, an abnormal operating condition detection operation, a data processing operation, or an operating condition control operation.

A fifth feature, combinable with any of the previous or following features, wherein the at least one hardware processor is further configured to: receive, a third message from a remote terminal unit (RTU), wherein the third message indicates that another motion has been detected; in response to receiving the third message, start a second timer; determine whether a second personal identification number (PIN) verification and a second radio-frequency identification (RFID) verification have succeeded before the second timer expires; and in response to determining that the second PIN verification and the second RFID verification have succeeded, initiate a logging procedure at the SCADA server.

A sixth feature, combinable with any of the previous or following features, wherein the first message is formatted according to an 802.1x standard.

A seventh feature, combinable with any of the previous or following features, wherein the first message is encrypted by the RTU.

In a third implementation, a non-transitory, computer-readable medium stores one or more instructions executable by a computer system to perform operations comprising: receiving, a first message from a remote terminal unit (RTU), wherein the first message indicates that a motion has been detected; in response to receiving the first message, starting a timer at a supervisory control and data acquisition (SCADA) server; determining whether a personal identification number (PIN) verification and a radio-frequency identification (RFID) verification have succeeded before the timer expires; and in response to determining that at least one of the PIN verification or the RFID verification fails, disabling a communication port connecting the RTU with the SCADA server.

The foregoing and other described implementations can each, optionally, include one or more of the following features:

A first feature, combinable with any of the following features, the operations further comprising, in response to determining that at least one of the PIN verification or the RFID verification fails, transmitting a second message to the RTU, wherein the second message initiates a recording of video images by a camera.

A second feature, combinable with any of the previous or following features, wherein the RTU performs a control operation of a field instrument while the communication port is disabled, and the control operation includes at least one of a valve control operation, an instrument reading operation, an abnormal operating condition detection operation, a data processing operation, or an operating condition control operation.

A third feature, combinable with any of the previous or following features, the operations further comprising: receiving, a third message from a remote terminal unit (RTU), wherein the third message indicates that another motion has been detected; in response to receiving the third messages, starting a second timer; determining whether a second personal identification number (PIN) verification and a second radio-frequency identification (RFID) verification have succeeded before the second timer expires; and in response to determining that the second PIN verification and the second RFID verification have succeeded, initiating a logging procedure at the SCADA server.

A fourth feature, combinable with any of the previous or following features, wherein the first message is formatted according to an 802.1x standard.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Non-transitory, computer-readable media suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/− R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, a first message from a remote terminal unit (RTU), wherein the first message indicates that a motion has been detected;
   in response to receiving the first message, starting a timer at a supervisory control and data acquisition (SCADA) server;
   determining whether a personal identification number (PIN) verification and a radio-frequency identification (RFID) verification with respect to the RTU have succeeded before the timer expires; and
   in response to determining that at least one of the PIN verification or the RFID verification fails, disabling a communication port connecting the RTU with the SCADA server.

2. The method of claim 1, further comprising, in response to determining that at least one of the PIN verification or the RFID verification fails, transmitting a second message to the RTU, wherein the second message initiates a recording of video images by a camera.

3. The method of claim 2, wherein the camera includes infra-red (IR) night vision capabilities.

4. The method of claim 1, wherein the RTU performs a control operation of a field instrument while the communication port is disabled, and the control operation includes at least one of a valve control operation, an instrument reading operation, an abnormal operating condition detection operation, a data processing operation, or an operating condition control operation.

5. The method of claim 2, further comprising:
   receiving, a third message from a remote terminal unit (RTU), wherein the third message indicates that another motion has been detected;
   in response to receiving the third message, starting a second timer;
   determining whether a second personal identification number (PIN) verification and a second radio-frequency identification (RFID) verification with respect to the RTU have succeeded before the second timer expires; and
   in response to determining that the second PIN verification and the second RFID verification have succeeded, initiating a logging procedure at the SCADA server.

6. The method of claim 1, wherein the first message is formatted according to an 802.1x standard.

7. The method of claim 1, wherein the first message is encrypted by the RTU.

8. A supervisory control and data acquisition (SCADA) server, comprising:
   a memory; and
   at least one hardware processor communicatively coupled with the memory and configured to:
   receive, a first message from a remote terminal unit (RTU), wherein the first message indicates that a motion has been detected;
   in response to receive the first message, start a timer at the supervisory control and data acquisition (SCADA) server;
   determine whether a personal identification number (PIN) verification and a radio-frequency identification (RFID) verification have succeeded before the timer expires; and
   in response to determining that at least one of the PIN verification or the RFID verification fails, disable a communication port connecting the RTU with the SCADA server.

9. The SCADA server of claim 8, further comprising:
   an interface configured to receive RFID information and a PIN input from the RTU, wherein the at least one hardware processor is configured to:
   determine whether the PIN verification has succeeded based on PIN input; and
   determine whether the RFID verification has succeeded based on the RFID information.

10. The SCADA server of claim 8, wherein the at least one hardware processor is further configured, in response to determining that at least one of the PIN verification or the RFID verification fails, to transmit a second message to the RTU, wherein the second message initiates a recording of video images by a camera.

11. The SCADA server of claim 10, wherein the camera includes infra-red (IR) night vision capabilities.

12. The SCADA server of claim 8, wherein the RTU performs a control operation of a field instrument while the communication port is disabled, and the control operation includes at least one of a valve control operation, an instrument reading operation, an abnormal operating condition detection operation, a data processing operation, or an operating condition control operation.

13. The SCADA server of claim 10, wherein the at least one hardware processor is further configured to:
   receive, a third message from a remote terminal unit (RTU), wherein the third message indicates that another motion has been detected;
   in response to receiving the third message, start a second timer;
   determine whether a second personal identification number (PIN) verification and a second radio-frequency identification (RFID) verification have succeeded before the second timer expires; and
   in response to determining that the second PIN verification and the second RFID verification have succeeded, initiate a logging procedure at the SCADA server.

14. The SCADA server of claim 8, wherein the first message is formatted according to an 802.1x standard.

15. The SCADA server of claim 8, wherein the first message is encrypted by the RTU.

16. A non-transitory, computer-readable medium storing one or more instructions executable by a computer system to perform operations comprising:
   receiving, a first message from a remote terminal unit (RTU), wherein the first message indicates that a motion has been detected;
   in response to receiving the first message, starting a timer at a supervisory control and data acquisition (SCADA) server;
   determining whether a personal identification number (PIN) verification and a radio-frequency identification (RFID) verification with respect to the RTU have succeeded before the timer expires; and
   in response to determining that at least one of the PIN verification or the RFID verification fails, disabling a communication port connecting the RTU with the SCADA server.

17. The non-transitory, computer-readable medium of claim 16, the operations further comprising, in response to determining that at least one of the PIN verification or the RFID verification fails, transmitting a second message to the RTU, wherein the second message initiates a recording of video images by a camera.

18. The non-transitory, computer-readable medium of claim 16, wherein the RTU performs a control operation of a field instrument while the communication port is disabled, and the control operation includes at least one of a valve control operation, an instrument reading operation, an abnormal operating condition detection operation, a data processing operation, or an operating condition control operation.

19. The non-transitory, computer-readable medium of claim 17, the operations further comprising:
   receiving, a third message from a remote terminal unit (RTU), wherein the third message indicates that another motion has been detected;
   in response to receiving the third message, starting a second timer;
   determining whether a second personal identification number (PIN) verification and a second radio-frequency identification (RFID) verification have succeeded before the second timer expires; and
   in response to determining that the second PIN verification and the second RFID verification have succeeded, initiating a logging procedure at the SCADA server.

20. The non-transitory, computer-readable medium of claim 16, wherein the first message is formatted according to an 802.1x standard.

* * * * *